US006540448B2

(12) United States Patent
Johnson

(10) Patent No.: US 6,540,448 B2
(45) Date of Patent: Apr. 1, 2003

(54) CUTTING TOOL WITH IMPROVED INSERT SEAT ARRANGEMENT FOR INDEXABLE CUTTING INSERTS

(75) Inventor: William B. Johnson, Loves Park, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 0 days.

(21) Appl. No.: 09/855,084

(22) Filed: May 14, 2001

(65) Prior Publication Data

US 2002/0168235 A1 Nov. 14, 2002

(51) Int. Cl.$^7$ ............................. B23B 27/16; B23C 5/00
(52) U.S. Cl. ............................................. 407/35; 407/43
(58) Field of Search ...................... 407/34, 35, 36, 407/113, 114, 115, 116, 43

(56) References Cited

U.S. PATENT DOCUMENTS

| | | |
|---|---|---|
| 1,460,030 A | 6/1923 | Mattson |
| 1,542,007 A | 6/1925 | Schroeder |
| 1,838,520 A | 12/1931 | Archer |
| 2,383,925 A | 9/1945 | De Vlieg ............................ 77/4 |
| 3,103,736 A | 9/1963 | Ortman, Jr. ...................... 29/96 |
| 3,213,716 A | 10/1965 | Getts ................................. 77/58 |
| 3,535,759 A | 10/1970 | Mueller ........................... 29/105 |
| 4,093,392 A | 6/1978 | Hopkins ........................ 407/48 |
| 4,273,479 A | 6/1981 | Raupp, Jr. et al. ........... 407/113 |
| 4,294,565 A | 10/1981 | Erkfritz ......................... 407/113 |
| 4,512,689 A | 4/1985 | Bylund ........................... 407/40 |
| 4,552,491 A | 11/1985 | Parker .......................... 407/107 |
| 4,626,140 A | 12/1986 | Zweekly et al. ............. 407/114 |
| 4,632,593 A | 12/1986 | Stashko ......................... 403/316 |
| 4,679,968 A | 7/1987 | Tsujimura et al. .......... 407/114 |
| 4,681,485 A | 7/1987 | Koelewijn .................... 407/42 |
| 4,808,044 A * | 2/1989 | Tsujimura et al. ............ 407/34 |
| 4,812,087 A | 3/1989 | Stashko ......................... 407/42 |
| 4,919,573 A | 4/1990 | Tsujimura et al. ............ 407/40 |
| 4,966,500 A | 10/1990 | Tsujimura et al. ............ 407/34 |
| 5,000,625 A | 3/1991 | Arai et al. ..................... 407/41 |
| 5,076,738 A | 12/1991 | Pano et al. .................. 407/110 |

(List continued on next page.)

FOREIGN PATENT DOCUMENTS

| | | |
|---|---|---|
| DE | 26 34 029 | 2/1978 |
| DE | 36 42 514 C1 | 6/1988 |
| DE | 93 05 518 | 8/1993 |
| EP | 0 037 949 B1 | 3/1989 |
| GB | 671005 | 4/1952 |
| GB | 2047589 A | 12/1980 |

OTHER PUBLICATIONS

Mil–Tec USA, Inc. product brochure entitled "Freedom Cutter® Milling System," dated 1997.
Lovejoy Milling Products product brochure entitled "XR–Extended Range Milling Products," dated 1993.
Ingersoll Cutting Tool Company publication entitled "The Cutting Edge," No. 1, 1990.
Ingersoll Cutting Tool Company publication entitled "High Positive Milling Cutters," 1990.
Ingersoll Cutting Tool Company publication entitled "Metal Cutting Principles," Second Edition, 1982.

Primary Examiner—Kien T. Nguyen
(74) Attorney, Agent, or Firm—Fitch, Even, Tabin & Flannery

(57) ABSTRACT

A cutting tool with a cutting tool holder and a plurality of replaceable indexable cutting inserts releasably attached to the holder. The holder has seats located about the circumference of one end of the holder for mounting of the cutting inserts. The seats are oriented with respect to the central axis of the tool holder such that not all seats have the same orientation, and this change in orientation allows greater use of the cutting edge of each insert.

27 Claims, 2 Drawing Sheets

U.S. PATENT DOCUMENTS

| | | | |
|---|---|---|---|
| 5,082,400 A | 1/1992 | Shiratori et al. | 407/42 |
| 5,102,268 A * | 4/1992 | Mitchell | 407/36 |
| 5,145,294 A | 9/1992 | Flueckiger | 407/42 |
| 5,221,162 A | 6/1993 | Okawa | 407/40 |
| 5,236,288 A | 8/1993 | Flueckiger | 407/36 |
| 5,346,336 A | 9/1994 | Rescigno | 407/104 |
| 5,597,268 A | 1/1997 | Izumi | 407/51 |
| 5,658,100 A | 8/1997 | Deiss et al. | 407/35 |
| 5,716,167 A * | 2/1998 | Siddle et al. | 407/36 |
| 5,868,529 A | 2/1999 | Rothballer et al. | 407/36 |
| 6,017,171 A | 1/2000 | Karlsson | 407/34 |
| 6,053,671 A | 4/2000 | Stedt et al. | 407/35 |
| 6,056,484 A * | 5/2000 | Mitchell et al. | 407/36 |

* cited by examiner

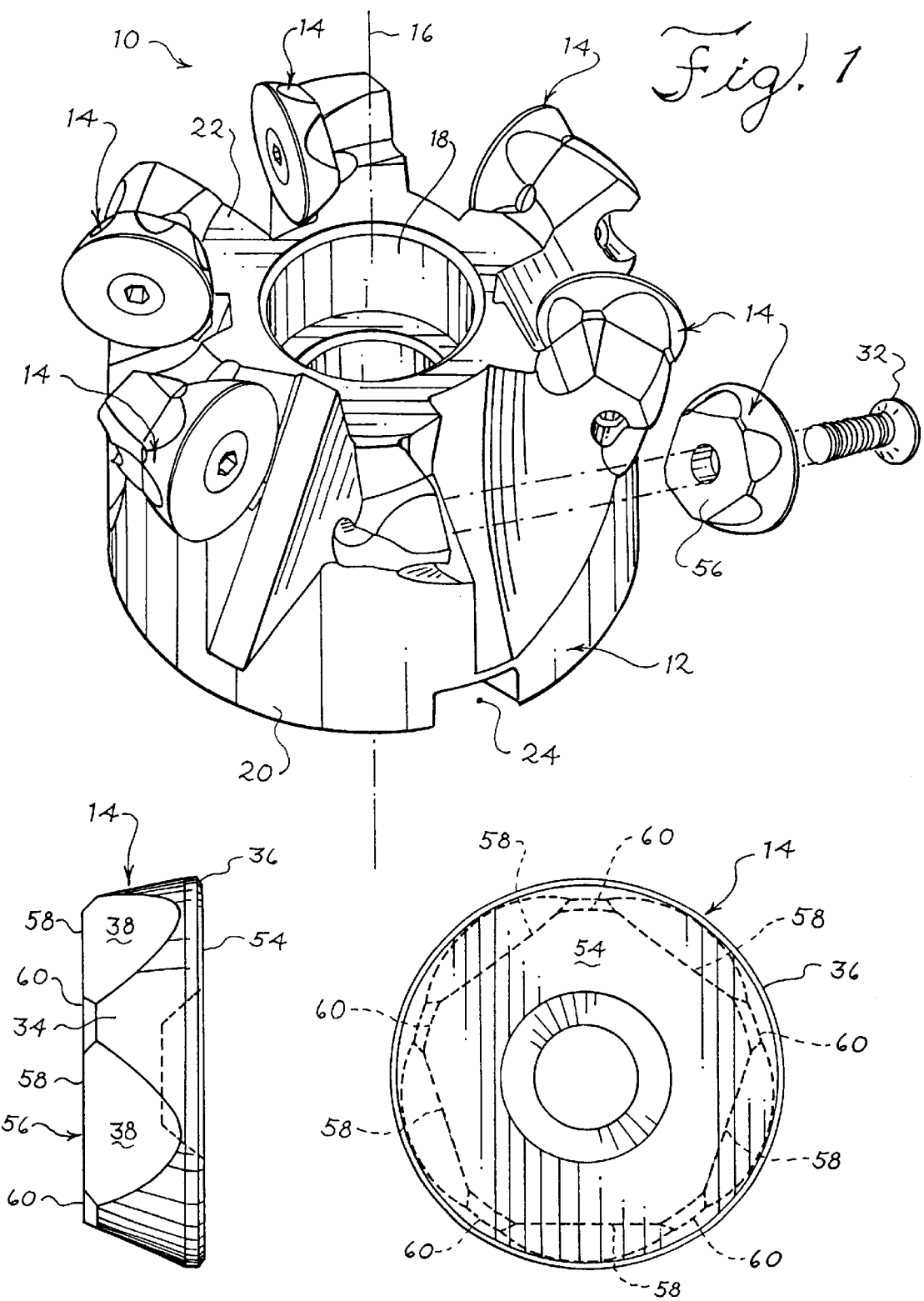

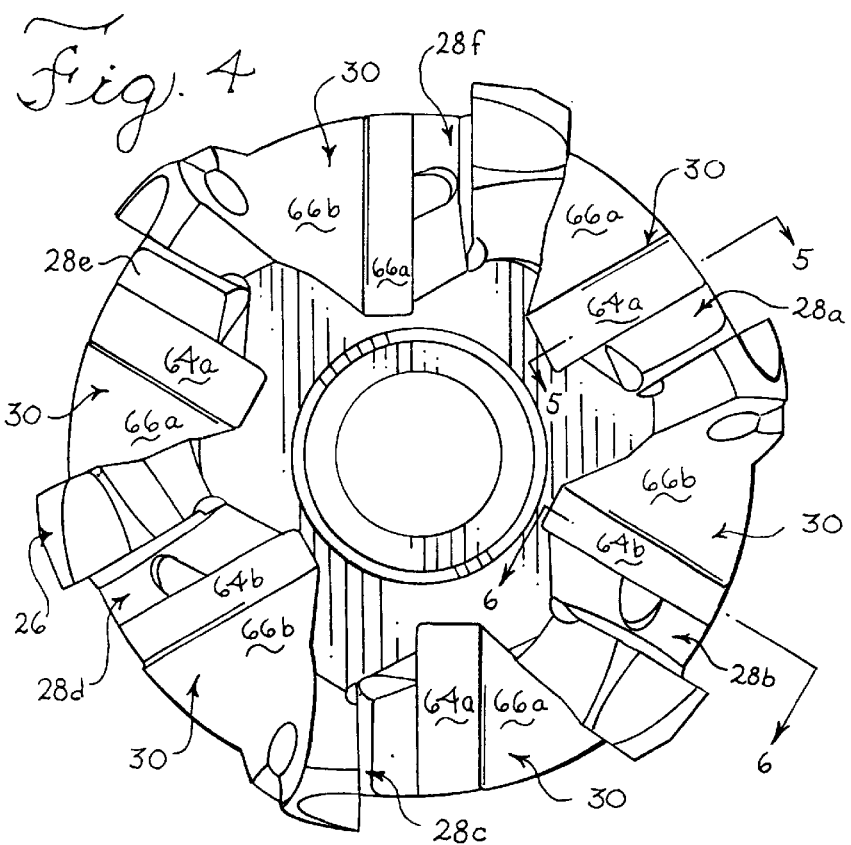
Fig. 4
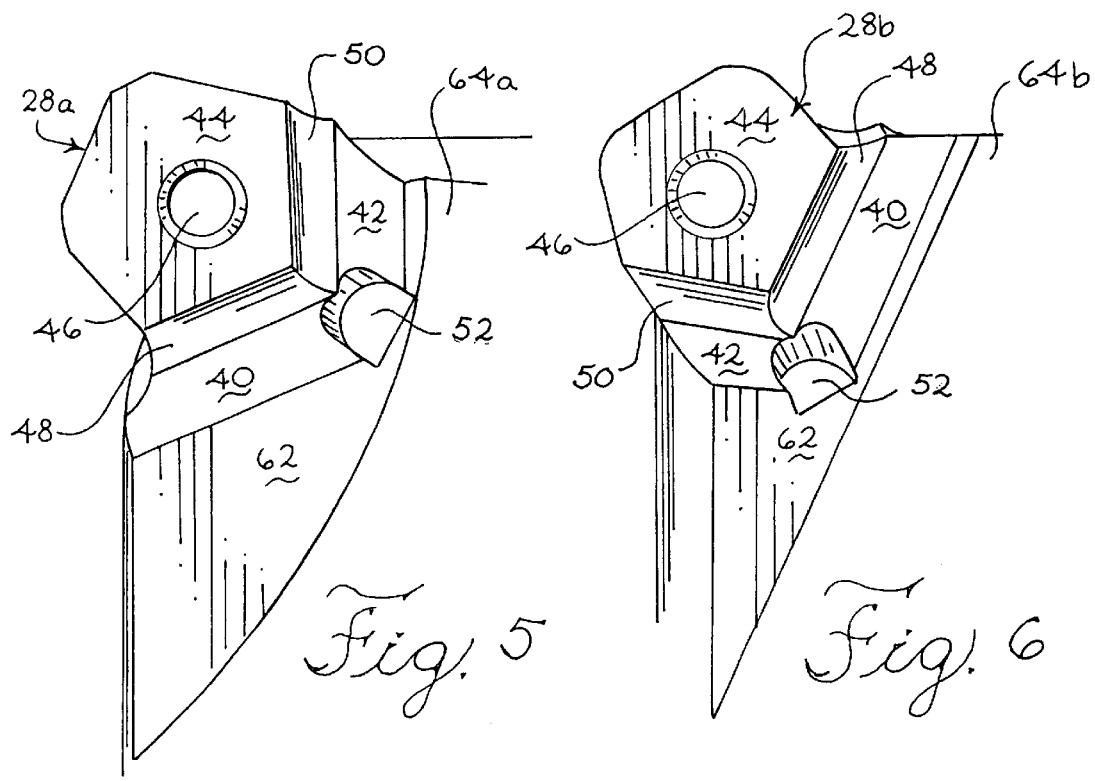
Fig. 5
Fig. 6

CUTTING TOOL WITH IMPROVED INSERT SEAT ARRANGEMENT FOR INDEXABLE CUTTING INSERTS

FIELD OF THE INVENTION

The present invention relates to cutting tools and, more specifically, to a cutting tool employing a plurality of indexable cutting inserts.

BACKGROUND OF THE INVENTION

There are a variety of cutting tools with inserts available for performing milling operations. Indexable inserts, formed from material such as sintered carbides or ceramics, are often used in milling operations, including machining aluminum, cast iron, steel, stainless steel, nickel based alloys, cobalt alloys and titanium. One type of cutting tool uses indexable cutting inserts removably secured in insert seats spaced circumferentially around the periphery of a tool body. In these conventional cutting tools, the insert seats are oriented in the same manner with respect to the central axis of the tool body, and thus, the inserts are indexed simply by rotating them in their respective insert seats to expose a different portion of the cutting edge.

More specifically, indexable cutting inserts used in such tools are available in a variety of shapes, including round cutting inserts (also referred to as button-type inserts). Round inserts have a circular cutting edge about the periphery of the insert, which provides a number of alternately usable cutting portions. During a cutting operation, only a portion of the round cutting edge actually cuts the workpiece. When one cutting position becomes worn, the insert maybe indexed, or turned, in the seat in order to bring a fresh cutting area into the active cutting position. The number of indexable cutting positions per insert depends on the desired depth of cut. When all of the cutting positions are worn, the insert is discarded and replaced with a new one.

Some types of conventional round cutting inserts have a frusto-conical side surface, which has flat areas that provide locating and clearance areas for the insert. More specifically, for example, the frusto-conical surface has a plurality of these flat areas (also referred to as facets), that make contact with one or more side seating surfaces (also referred to as minor seating surfaces) of an insert seat for locating the insert in the seat to facilitate indexing and then to prevent the insert from rotating during operation of the cutting tool. After being located in the insert seat, the insert is secured with a screw that extends through a hole in the center of the insert and threads into a bore in the bottom seating surface (also referred to as the major seating surface) of the insert seat.

Experience reveals many considerations (some of which are competing) that need to be made in designing cutting tools with indexable inserts. These considerations, for example, include: (1) maximizing the number of inserts per tool holder; (2) preventing the inserts from rotating or slipping during cutting operation; (3) maximizing the number of indexable cutting positions per insert; and (4) providing the required depth of cut. Many of the designs used to address these considerations have shortcomings.

For example, one way to increase the number of inserts per tool holder is to reduce the amount of material at the periphery used to support the insert seat. The removal of this material was thought necessary due to machining techniques for manufacturing the tool holder. This is not desired in that it adversely affects the operating integrity of the cutting tool.

In conventional cutting inserts, the number of cutting positions per insert often corresponds to the number of facets on the insert. For example, an insert with five facets has five cutting positions. When a cutting position is worn, the insert is removed from the seat of the tool and rotated so that at least one new facet occupies the seat of the tool. The number of cutting positions per insert can be increased by adding more facets on an insert. Increasing the number of facets, however, reduces the surface area per facet which, in effect, increases the curvature of the edge surface of the insert. In turn, the reduced surface area and increased curvature hampers reliable insert location in the insert seat and increases insert slippage during machining operation.

Thus, there is a need for an improved cutting tool that increases the number of cutting positions on an insert but, at the same time, provides reliable locating of the insert in the insert seat and prevents insert rotation during cutting operations. It is preferred to increase the number of indexable cutting positions on an insert without correspondingly increasing the number of facets on the insert (or, in other words, reducing the surface area per facet). Such a cutting tool would be less expensive and more efficient than conventional cutting tools because more of the cutting edge of each insert could be used in a reliable fashion before being discarded.

SUMMARY OF THE INVENTION

In accordance with the present invention, a cutting tool is provided that overcomes the disadvantages of the prior art. The cutting tool includes a generally cylindrical cutting tool body with a central axis. The tool is adapted to be rotated in a predetermined direction about this axis. The body has a working end with an outer periphery and a plurality of seats formed in the tool body and spaced circumferentially about the outer periphery of the working end. Each of the seats has a major seating surface and at least one minor seating surface. The seats are divided into two or more sets of seats. Each set has one or more seats. The one or more minor seating surfaces of each set are angled relative to the central axis of the cutting tool body so that the angles are different between the sets.

Each set may consist of one seat. Alternatively, each set may consist of two or more seats, with the seats alternating around the circumference of the cutting tool holder between seats of different sets. There may be exactly two sets of seats and such seats alternate around the circumference of the cutting tool holder between seats of the two different sets. Each seat may be comprised of exactly two minor seating surfaces, one having a larger area than the other. In addition, the minor seating surface with the larger area may change its positions between the first and second sets of seats, from being aligned more toward the central axis to being aligned more radially along the body of the tool holder relative to the central axis. Additionally, the angle between the minor seating surfaces may be obtuse.

BRIEF DESCRIPTION OF THE DRAWINGS

FIG. 1 is a perspective view of a cutting tool holder with a number of mounted cutting inserts and one detached cutting insert in accordance with the present invention;

FIG. 2 is a side elevational view one of the cutting inserts of FIG. 1;

FIG. 3 is a top plan view of the cutting insert of FIG. 2;

FIG. 4 is a top plan view of the cutting tool holder of FIG. 1 without the cutting inserts mounted in the insert seats;

FIG. 5 is a cross-sectional view of the cutting tool holder taken along line 5—5 of FIG. 4; and FIG. 6 is a cross-sectional view of the cutting tool holder taken along line 6—6 of FIG. 4.

DETAILED DESCRIPTION OF THE PREFERRED EMBODIMENT

As shown in FIG. 1, the present invention, by way of example, is illustrated in a milling cutting tool 10 consisting of a tool holder 12 and a number of inserts 14. The cutting tool 10 is used to machine workpieces of metal, such as aluminum, cast iron, steel, stainless steel, nickel based alloys, cobalt alloys and titanium, to form the workpieces into a desired size and shape.

The preferred tool holder 12 is substantially cylindrical with a central axis 16 about which it rotates during operation. The holder 12 defines a bore 18 through the center about the central axis 16. The bore 18 receives a shank of a bolt (not shown) designed to secure the holder 12 to a spindle (not shown) of a milling machine.

The preferred material for the tool holder is an alloy high strength steel having a hardness of 300 to 360 Brinell. The outer surface of the holder is then nitrided to introduce a nitrogen diffusion layer having a depth of about 0.015 inches. This treatment increases the surface hardness of the tool holder to 420 to 500 Brinell.

The tool holder 12 includes a coupling end portion 20 and a working end portion 22 that is disposed towards a workpiece during operation of the tool 10. The coupling end portion 20 is designed to engage the drive spindle (not shown) of the milling machine for rotation therewith. More specifically, the coupling end portion 20 includes a channel 24 with a generally rectangular-like cross-section. The channel 24 receives a driver (not shown) of complementary shape on the spindle to facilitate an interlocking drive relationship between the milling machine and the tool holder 12.

As illustrated in FIG. 4, the working end portion 22 includes an outer periphery portion 26 defining a number of angularly spaced insert seats 28a–f and a chip pocket 30 in front of each of the insert seats 28a–f for the removed metal material to be discharged during operation in the form of chips. Each of the insert seats 28a–f is designed to receive one of the indexable inserts 14 for performing the cutting operation on the workpiece.

As illustrated in FIGS. 2 and 3, each of the inserts 14 includes a side surface 34 and a cutting edge 36. The side surface includes a number of flats or facets 38 that engage the insert seat 28a–f for locating the insert 14 in its respective insert seat 28a–f and for preventing insert slippage during operation. As shown in FIG. 1, the cutting edge 36 of each insert 14 includes a portion extending beyond the tool holder 12, when such insert is mounted, for cutting the workpiece during operation. Each of the inserts 14 can be detached by removing the screw 32 and indexed (i.e., rotated) and positioned back in its respective insert seat 28a–f to expose a new portion of its cutting edge for use.

Referring to FIGS. 5 and 6, each insert seat 28a–f is defined by a pair of minor seating surfaces 40 and 42 and a major seating surface 44. The minor seating surfaces 40 and 42 engage the facets 38. The angular disposition of the minor seating surfaces 40 and 42 relative to one another and to the major seating surface 44 is uniform with all the insert seats 28a–f. The angle between the minor seating surfaces 40 and 42 is preferably an obtuse angle. The disposition of the minor seating surfaces 40 and 42 relative to the central axis 16 varies between adjacent insert seats 28a–f. This enables the inserts 14 not only to be indexed rotationally but also to be indexed to adjacent insert seats 28a–f to expose continuous portions of the cutting edge 36. Thus, more of the cutting edge 36 can be exposed over conventional indexing, and consequently, the surface area of the facets 38 remains sufficiently large to facilitate reliable insert locating and slip prevention. The cutting tool, in accordance with the present invention, may be fashioned with a variety of cutting diameters and number of inserts, which are considerations dictated by the nature of the work to be performed by the tool. The major seating surface 44 faces circumferentially in the direction of rotation of the cutting tool 10. A hole 46 extends into the outer periphery portion 26 of the working end portion 22 at approximately the center of, and perpendicular to, the major seating surface 44.

In accordance with the present invention, the preferred embodiment has six insert seats 28a–f, wherein the minor seating surfaces 40 and 42 do not have the same orientation with respect to the central axis 16 of the cutting tool holder 12. As shown in FIG. 4, the orientation of the insert seats is alternately staggered. That is, the minor seating surfaces 40 and 42 of insert seats 28a, 28c and 28e have one orientation (FIG. 5), and the minor seating surfaces 40 and 42 of inserts 28b, 28d and 28f have a second orientation (FIG. 6). Thus, an insert may be indexed by removing the insert and placing the insert in a new seat having a different orientation, resulting in a rotation of the insert to an intermediate cutting position that would not otherwise have been available. In accordance with the present invention, the insert seats of the cutting tool can be configured to accommodate a user's needs with respect to the amount of cutting surface used on each insert, the depth of cut required, and the degree to which the inserts are prevented from rotating, or slipping, in the seats.

As illustrated in FIGS. 5 and 6, one minor seating surface 40 is larger in area than the other minor seating surface 42. With respect to the inserts seats 28a, 28c and 28e, the larger surface 40 is aligned more radially with respect to the tool holder 22 relative to the central axis 16, and the smaller surface 42 is aligned more parallel to the central axis 16. The opposite orientation is used for the other insert seats 28b, 28d and 28f. That is, the smaller surface 42 is aligned more radially with respect to the tool holder 22 relative to the central axis 16, and the larger surface 40 is aligned more parallel to the central axis 16.

A chip pocket 30 is located in front of each of the insert seats 28a–f, as shown in FIGS. 6 and 7. The chip pocket 30 is defined by a first surface 62 that is planar, a second surface that alternates between arcuate 64a and planar 64b, and a third surface that also alternates between arcuate 66a and planar 66b. The difference in shape of the chip pockets 30 is due primarily to ease and cost of manufacturing the tool holder. The first surface 62 defines the rear of the chip pocket 30 and is located in front of and parallel to the plane defined by the major seating surface 44 of each insert seat 28a–f. The second surface 64a or 64b defines the side of the chip pocket 30. The second surface 64a or 64b alternates between arcuate 64a, shown in FIG. 5, and planar 64b, shown in FIG. 6. The third surface 66a or 66b defines the front of the chip pocket 30 and also alternates between arcuate 66a and planar 66b, in correspondence with the alternation of surface orientation of the second surface 64a or 64b, respectively.

As best shown in FIGS. 5 and 6, grooves 48 and 50 are preferably provided between the major seating surface 44 and each of the minor seating surfaces 40 and 42. A groove 52 is also preferably provided between the minor seating surfaces 40 and 42. The grooves 48, 50 and 52 provide relief for the edges of the inserts 14 (which are described below) to ensure that the inserts 14 locate properly in their respective insert seat 28a–f.

Referring to FIGS. 2 and 3, there is illustrated a cutting insert 14 embodying features in accordance with the present invention. The insert 14 has a generally button-like shape and is composed of a suitable cutting material, such as tungsten carbide. The insert 14 comprises a substantially planar front face 54 and a planar rear face 56 that is substantially parallel to the front face 54 (FIG. 1). When the insert 14 is mounted into one of the insert seats 28a–f, the rear face 56 engages the major seating surface 44. The circular cutting edge 36 is formed at the intersection between the outer edge of front face 54 and the side clearance surface 34.

As mentioned above, the clearance surface 34 contains a plurality of flat planar areas 38 (or facets) that are used to locate the insert 14 in its respective insert seat 28a–f and to prevent the insert 14 from rotating during operation of the tool. The preferred insert 14 has a frusto-conical clearance surface with five identical and equidistantly spaced facets 38 (shown in phantom in FIG. 3). Each facet 38 has a height that is at least about eighty percent of the insert height. Thus, the outer perimeter of the bottom rear surface has ten edges (five substantially straight edges 58 at the facets and five arc segments 60 spaced between the facets). When an insert 14 is mounted in its respective insert seat 28a–f, each of the minor seating surfaces 40 and 42 is engaged by one of two adjacent facets 38.

More specifically, as shown in FIGS. 2 and 3, the preferred inserts 14 have five facets 38, which are equidistantly spaced at, e.g., 72 degrees apart from each other about the circumference of the frusto-conical clearance surface 34. The difference in orientation between the minor seating surfaces of the two different configurations, as shown in FIGS. 6 and 7, is approximately 36 degrees. Thus, when a cutting position on an insert is worn, the insert may be moved to the adjacent seat and rotated 36 degrees.

In accordance with conventional cutting tools with uniformly oriented seats, the five-faceted insert would have five cutting positions, corresponding to rotation of the cutting insert through its facets. These five cutting positions would be spaced 72 degrees apart on the insert. By staggering the seats 36 degrees, however, the cutting tool of the present invention has additional cutting positions. The result is a total of 10 cutting positions, i.e., five additional cutting positions are available and these cutting positions are located in between the five cutting positions originally available.

Obviously, numerous other useful variations in the number and orientation of the insert seats are available. In an alternative embodiment, the insert seats of the cutting tool may be fashioned so that no two insert seats have the same orientation with respect to the minor seating surfaces. For example, the cutting tool may have only three insert seats with the minor seating surfaces of each offset from a preceding one by forty degrees. Thus, none of the insert seats would have the same minor seating surface orientation. If a three-faceted insert is used, this arrangement might produce nine cutting positions on the insert.

In a third embodiment, the cutting tool may be fashioned so that there are three sets of alternating insert seat configurations. The cutting tool may have six insert seats with each seat within a set offset from a preceding insert seat by twenty-four degrees. In this embodiment, pairs of insert seats would have the minor seating surfaces oriented in the same manner. If a five-faceted insert is used, this arrangement might produce fifteen cutting positions and might be useful for work requiring a very shallow depth of cut.

Numerous useful staggering arrangements of insert seat configuration can be designed, as required by the nature of the work. Insert seats may be alternated uniformly in a progression from one to the next, or the insert seats may be staggered in some non-uniform manner. The proper staggering arrangement may be determined, in part, by the number of cutting positions desired and the depth of cut required, as described below.

The depth of cut required for a particular application is a factor that is used to determine how the insert seats should be staggered and how many cutting positions are desired in an insert. For example, where the acceptable depth of cut may be reduced, more cutting positions may be provided on the insert. By way of further example, the tool holder 12 and insert 14 provides 10 indexable cutting positions and can generally be used to cut to a maximum depth of cut of $\frac{1}{10}^{th}$ of an inch.

While there have been illustrated and described particular embodiments of the present invention, it will be appreciated that numerous changes and modifications will occur to those skilled in the art, and it is intended in the appended claims to cover all those changes and modifications which fall within the spirit and scope of the present invention.

What is claimed is:

1. A cutting tool holder comprising:
   a generally cylindrical cutting tool body having a central axis and adapted to be rotated in a predetermined direction about the axis, the body having a working end with an outer periphery;
   a plurality of seats formed in the tool body and spaced circumferentially about the outer periphery of the working end, each of the seats having a major seating surface with an outer periphery, having one or more minor seating surfaces about at least a portion of the outer periphery, and a central axis perpendicular to the major seating surface;
   wherein the seats are divided into two or more sets of seats, each set having one or more seats, and being set to a different rotational orientation about the central axis of the seat such that the one or more minor seating surfaces of each set are angled relative to the central axis of the cutting tool body and the angles being different between the sets.

2. A cutting tool holder according to claim 1, wherein each set consists of one seat.

3. A cutting tool holder according to claim 1, wherein
   each set consists of two or more seats; and
   the seats alternate around the circumference of the cutting tool holder between seats of different sets.

4. A cutting tool holder according to claim 3, wherein there are exactly two sets of seats and the seats alternate around the circumference of the cutting tool holder between seats of the two different sets.

5. A cutting tool holder according to claim 4, wherein the one or more minor seating surfaces of each seat comprise two minor seating surfaces, one having a larger area than the other.

6. A cutting tool holder according to claim 5, wherein the minor seating surface having the larger area changes positions between the first and second sets of seats, from being aligned more toward the central axis to being aligned more radially along the body of the tool holder relative to the central axis.

7. A cutting tool holder according to claim 6, wherein the angle between the two minor seating surfaces is obtuse.

8. A cutting tool comprising:
   a generally cylindrical cutting tool body having a central axis and adapted to be rotated in a predetermined direction about the axis, the body having a working end with an outer periphery;
   a plurality of seats formed in the tool body and spaced circumferentially about the outer periphery of the working end, each of the seats having a major seating surface with an outer periphery, having one or more minor seating surfaces about at least a portion of the outer periphery, and a central axis perpendicular to the major seating surface;

wherein the seats are divided into two or more sets of seats, each set having one or more seats, and being set to a different rotational orientation about the central axis of the seat such that the one or more minor seating surfaces of each set are angled relative to the central axis of the cutting tool body and the angles being different between the sets; and a plurality of cutting inserts that can be mounted in the seats.

9. A cutting tool comprising:

a generally cylindrical cutting tool body having a central axis and adapted to be rotated in a predetermined direction about the axis, the body having a working end with an outer periphery;

a plurality of seats formed in the tool body and spaced circumferentially about the outer periphery of the working end, each of the seats having a major seating surface and having one or more minor seating surfaces;

wherein the seats are divided into two or more sets of seats, each set having one or more seats, and the one or more minor seating surfaces of each set are angled relative to the central axis of the cutting tool body, the angles being different between the sets;

a plurality of cutting inserts that can be mounted in the seats, each insert having a front surface that is substantially annularly-shaped with an outer cutting edge, a rear surface spaced from the front surface and that can be mounted on the major seating surface of one of the seats, a clearance surface extending between the front and rear surfaces, and a plurality of circumferentially spaced facets formed in the clearance surface for abutment with the one or more minor seating surfaces of one of the seats.

10. A cutting tool according to claim 9, wherein each insert further comprises a circular outer cutting edge and a frusto-conical clearance surface.

11. A cutting tool according to claim 10, wherein each minor seating surface has a surface area at least as large as each facet.

12. A cutting tool according to claim 11, wherein the facets of the inserts are spaced below the cutting edge.

13. The cutting tool according to claim 12, wherein each insert has five facets spaced equidistantly apart along the circumference of the clearance surface.

14. The cutting tool according to claim 13, wherein the height of each facet is at least eighty percent of the height of the insert.

15. A cutting tool comprising:

a generally cylindrical cutting tool body having a central axis and adapted to be rotated in a predetermined direction about the axis, the body having a working end with an outer periphery;

six seats formed in the tool body and circumferentially spaced around the outer periphery of the working end, each of the seats including a major seating surface with an outer periphery, having one or more minor seating surfaces about at least a portion of the outer periphery, and a central axis perpendicular to the major seating surface;

wherein the six seats further comprise a first and second set of three seats, the six seats alternating between the first and second set as one proceeds around the circumference of the cutting tool, and being set to a different rotational orientation about the central axis of the seat such that the one or more minor seating surfaces of each set are set at a different predetermined angle relative to the central axis of the cutting tool body; and a plurality of cutting inserts that can be mounted in the seats.

16. The cutting tool according to claim 15, wherein the predetermined angles are offset from each other by 36 degrees.

17. A cutting tool comprising:

a generally cylindrical cutting tool body having a central axis and adapted to be rotated in a predetermined direction about the axis, the body having a working end with an outer periphery;

six seats formed in the tool body and circumferentially spaced around the outer periphery of the working end, each of the seats including a major seating surface and having one or more minor seating surfaces;

wherein the six seats further comprise a first and second set of three seats, the six seats alternating between the first and second set as one proceeds around the circumference of the cutting tool, and the one or more minor seating surfaces of each set are set at a different predetermined angle relative to the central axis of the cutting tool body, the predetermined angles are offset from each other by 36 degrees;

a plurality of cutting inserts that can be mounted in the seats, each insert having a front surface that is substantially annularly-shaped with an outer cutting edge, a rear surface that is spaced from the front surface and that can be mounted on the major seating surface of one of the seats, a clearance surface extending between the front and rear surfaces, and a plurality of circumferentially spaced facets formed in the clearance surface for abutment with the minor seating surfaces of one of the seats.

18. A cutting tool according to claim 17, wherein each insert further comprises a circular outer cutting edge and a frusto-conical clearance surface.

19. A cutting tool according to claim 18, wherein each insert has five facets spaced equidistantly apart along the circumference of the clearance surface.

20. The cutting tool according to claim 19, wherein the facet height of each insert is at least eighty percent of the height of the insert.

21. A multi-faceted indexable cutting insert comprising:

a front surface that is substantially annularly-shaped with an outer cutting edge;

a rear mounting surface that is spaced from the front surface;

a clearance surface extending between the front and rear surfaces; and a plurality of circumferentially spaced facets formed in the clearance surface, each facet having a height that is at least eighty percent of the height of the cutting insert.

22. A cutting tool according to claim 21, wherein each insert further comprises a circular outer cutting edge and a frusto-conical clearance surface.

23. A cutting insert according to claim 22, wherein the facets of the inserts are spaced below the cutting edge.

24. A cutting insert according to claim 23, wherein the insert further comprises a hole through the center of the insert for receiving a fixing fastener.

25. A cutting insert according to claim 24, wherein the fixing fastener is a securing screw.

26. A cutting insert according to claim 22, wherein the insert has five facets with the facets spaced equidistantly apart along the circumference of the clearance surface.

27. A cutting insert according to claim 24, wherein the facet height of the insert is generally eighty-two percent of the height of the insert.

* * * * *